A. & I. JENNINGS.
Paper-Pail.
No. 8,190. Reissued April 23, 1878.
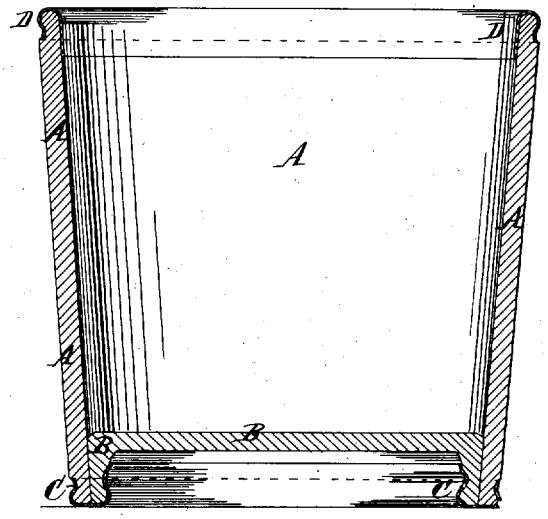
Inventor
Augustus Jennings.
Isaac Jennings.
By Thos P. Hoo
Atty
Witnesses.
J. J. Vetterlein
Geo. S. Wightman

UNITED STATES PATENT OFFICE.

AUGUSTUS JENNINGS AND ISAAC JENNINGS, OF FAIRFIELD, CONNECTICUT.

IMPROVEMENT IN PAPER PAILS.

Specification forming part of Letters Patent No. 82,526, dated September 29, 1868; Reissue No. 8,190, dated April 23, 1878; application filed January 29, 1878.

*To all whom it may concern:*

Be it known that we, AUGUSTUS JENNINGS and ISAAC JENNINGS, of Fairfield, in the county of Fairfield and State of Connecticut, have invented certain new and useful Improvements in Paper Pails; and we do hereby declare that the following is a full, clear, and exact description thereof, which will enable others skilled in the art to make and use the same, reference being had to the accompanying drawing, forming part of this specification.

The figure is a vertical section of a paper pail constructed in accordance with our invention.

Our invention has for its object to improve the construction of paper pails and other vessels, so as to make them more durable and stronger in construction, and more reliable in use; and it consists in the manner in which the bottom is attached to the body of the pail, and in the manner of strengthening and protecting the bottom and top edges of the body of the pail, as hereinafter more fully described.

A is the body of the vessel, which is made of paper, in one piece, without seam or joint, and which may be made straight or tapering, as desired, or according to the particular use for which the said vessel is intended. B is the bottom of the vessel, which is also made of paper, in the shape of an inverted shallow dish—that is to say, with a downwardly-projecting flange, as shown in the figure, said flange being so formed as to correspond with and fit into the lower part of the body A of the vessel, in such a way as to lie closely against the inner side of said body, as shown in the figure, the lower edge of the said flange of the bottom B and the lower edge of the body A being even with each other.

The body A is grooved around its lower part, just above its lower edge; and the flange of the bottom B is also grooved, just above its lower edge, as shown in the figure.

C is a metallic binding, which is struck or spun up into such a shape as to cover the edges of the body A and flange of the bottom B, overlapping the outer side of the said body and the inner side of the said flange. The turned-up sides of the binding C are then pressed into the grooves in the body A and flange of the bottom B, to secure the said bottom to the said body, and to prevent the said binding from coming off, and so as at the same time to strengthen and protect the lower edge of the pail.

The body A of the pail has a groove formed around it, just beneath its upper edge, upon its inner or outer surface, or upon both.

D is a metallic binding, struck up or spun so as to fit upon the upper edge of the pail or vessel, and the outer side or part of which is pressed into the groove formed in the said body A, so as to secure the said binding D securely to the said body of the said pail.

The body A and bottom B are both formed of paper-pulp, in the manner described in Patent No. 71,390, granted to us November 26, 1867.

This construction we design to apply to the formation of water-pails, chamber-pails, water-coolers, barrels, tubs, and other vessels of cylindrical form for containing liquids, whether the sides or body of said vessels be made straight or tapering; and it enables paper barrels or casks to be formed with the same facility as open vessels.

This manner of construction may also be applied with equal advantage whether the body A be made of paper or other material.

We claim as our invention—

1. A pail or vessel having a downwardly-projecting flange upon the bottom or head B thereof, and having also a body, A, and a binding, C, securing the said parts A and B together, substantially as hereinbefore set forth.

2. As an article of manufacture, a paper pail or vessel having a groove around it in proximity to its edge, and a continuous metallic binding or hoop extending across its edge and upon the sides thereof, and secured in place by the said groove, substantially as hereinbefore set forth.

AUGUSTUS JENNINGS.
ISAAC JENNINGS.

Witnesses:
JNO. S. PATTERSON,
A. W. SEAMAN.